United States Patent
Lai et al.

(10) Patent No.: US 9,015,331 B2
(45) Date of Patent: *Apr. 21, 2015

(54) METHOD FOR IMPLEMENTING A CONVERGENT WIRELESS LOCAL AREA NETWORK (WLAN) AUTHENTICATION AND PRIVACY INFRASTRUCTURE (WAPI) NETWORK ARCHITECTURE IN A LOCAL MAC MODE

(75) Inventors: Xiaolong Lai, Shaanxi (CN); Jun Cao, Shaanxi (CN); Zhiqiang Du, Shaanxi (CN); Manxia Tie, Shaanxi (CN); Li Ge, Shaanxi (CN); Zhenhai Huang, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/203,646

(22) PCT Filed: Dec. 14, 2009

(86) PCT No.: PCT/CN2009/075538
§ 371 (c)(1),
(2), (4) Date: Aug. 26, 2011

(87) PCT Pub. No.: WO2010/096997
PCT Pub. Date: Sep. 2, 2010

(65) Prior Publication Data
US 2011/0307621 A1 Dec. 15, 2011

(30) Foreign Application Priority Data
Feb. 27, 2009 (CN) .......................... 2009 1 0021418

(51) Int. Cl.
*G06F 15/16* (2006.01)
*H04W 12/06* (2009.01)
(Continued)

(52) U.S. Cl.
CPC ............... *H04W 12/06* (2013.01); *H04L 63/10* (2013.01); *H04L 63/08* (2013.01); *H04W 84/12* (2013.01); *H04L 63/062* (2013.01); *H04L 63/065* (2013.01); *H04W 12/04* (2013.01)

(58) Field of Classification Search
CPC ................................. H04L 63/08; H04L 63/10
USPC .................................... 709/226–229; 726/1–3
See application file for complete search history.

(56) References Cited

U.S. PATENT DOCUMENTS
6,788,658 B1   9/2004 Bims
7,991,152 B2   8/2011 Gueron et al.
(Continued)

FOREIGN PATENT DOCUMENTS
CN   1681239 A   10/2005
CN   1691582 A   11/2005
(Continued)

OTHER PUBLICATIONS
Wu et al, Security Analysis of WAPI Authentication and Key Exchange Protocol, 2007.*
(Continued)

*Primary Examiner* — Chris Parry
*Assistant Examiner* — Weiwei Stiltner
(74) *Attorney, Agent, or Firm* — Harness, Dickey & Pierce, P.L.C.

(57) ABSTRACT

A method for implementing a convergent Wireless Local Area Network (WLAN) Authentication and Privacy Infrastructure (WAPI) network architecture in a local Medium Access Control (MAC) mode is provided and includes the following steps: the MAC function and WAPI function of Access Point (AP) are divided between Wireless Terminal Point (WTP) and Access Controller (AC) to construct a local MAC mode; the convergence of WAPI protocol and the convergent WLAN network architecture is implemented in the local MAC mode; the process of association and connection between Station (STA), WTP and AC is performed; the process of notification of the beginning of the execution of the WLAN Authentication Infrastructure (WAI) protocol between AC and WTP is performed; the process of the execution of the WAI protocol between STA and AC is performed; the process of notification of the end of the execution of the WAI protocol between AC and WTP is performed; the process of encrypted communication between WTP and STA is performed by use of WPI.

10 Claims, 2 Drawing Sheets

(51) Int. Cl.
*H04L 29/06* (2006.01)
*H04W 84/12* (2009.01)
*H04W 12/04* (2009.01)

(56) References Cited

U.S. PATENT DOCUMENTS

| | | | |
|---|---|---|---|
| 8,086,749 B2 | 12/2011 | Townsley et al. | |
| 8,335,490 B2 | 12/2012 | Kaippallimalil | |
| 2005/0044249 A1 | 2/2005 | Teng et al. | |
| 2005/0182830 A1 | 8/2005 | Abhishek et al. | |
| 2006/0129807 A1* | 6/2006 | Halasz et al. | 713/163 |
| 2008/0072047 A1 | 3/2008 | Sarikaya et al. | |
| 2008/0117477 A1* | 5/2008 | Fujise | 358/468 |
| 2008/0134288 A1* | 6/2008 | Halasz et al. | 726/2 |
| 2008/0295144 A1* | 11/2008 | Cam-Winget et al. | 726/1 |
| 2009/0052674 A1* | 2/2009 | Nishida et al. | 380/278 |
| 2010/0217986 A1 | 8/2010 | Schneider | |
| 2011/0058670 A1* | 3/2011 | Ala-Laurila et al. | 380/247 |
| 2011/0307621 A1 | 12/2011 | Lai et al. | |
| 2011/0307943 A1 | 12/2011 | Du et al. | |
| 2011/0310771 A1 | 12/2011 | Tie et al. | |

FOREIGN PATENT DOCUMENTS

| | | | |
|---|---|---|---|
| CN | 1905504 | A | 1/2007 |
| CN | 1996840 | A | 7/2007 |
| CN | 101155396 | A | 4/2008 |
| CN | 101192923 | A | 6/2008 |
| CN | 101577904 | A | 11/2009 |
| CN | 101577905 | A | 11/2009 |
| CN | 101577978 | A | 11/2009 |
| WO | WO-2005081567 | A1 | 9/2005 |
| WO | WO 2008069520 | A1 * | 6/2008 |
| WO | WO-2008080351 | A1 | 7/2008 |

OTHER PUBLICATIONS

Xiang Wang, et al., "Communication Protocol of Centralized WLAN Architecture," Computer Engineering, Nov. 2008, vol. 34, No. 22, pp. 115-117.
International Search Report (in Chinese with English translation) and Written Opinion (in Chinese) for PCT/CN2009/075536, mailed Mar. 25, 2010.
International Search Report regarding Application No. PCT/CN2009/075539, mailed Mar. 25, 2010.
Chinese Office Action regarding Application No. 200910021422.6, dated Jul. 12, 2010. Summary provided by Unitalen Attorneys at Law.
U.S. Office Action regarding U.S. Appl. No. 13/203,643, mailed Mar. 21, 2013.
International Search Report (English and Chinese) and Written Opinion of the ISA (Chinese), ISA/CN, Beijing, China, mailed Mar. 18, 2010.
Zhao-Hui Tang et al. "On the Security of WAI Protocol in the Third Version of WAPI." International Conference on Intelligent Information Hiding and Multimedia Signal Processing. 2008.
Qiang Tang. "On the Security of Three Versions of the WAI Protocol in Chinese WLAN Implementation Plan." Second International Conference on Communications and Networking in China. Aug. 22-24, 2007.
Li Huixian and Pang Liaojun. "Improvement on WLAN multicast key management protocol." 2008 International Conference on Computational Intelligence and Security.
Final U.S. Office Action regarding U.S. Appl. No. 13/203,643, mailed Jul. 23, 2013.
Notice of Allowance regarding U.S. Appl. No. 13/203,643, mailed Oct. 4, 2013.
Office Action regarding U.S. Appl. No. 13/203,645, Nov. 7, 2013.

* cited by examiner

METHOD FOR IMPLEMENTING A CONVERGENT WIRELESS LOCAL AREA NETWORK (WLAN) AUTHENTICATION AND PRIVACY INFRASTRUCTURE (WAPI) NETWORK ARCHITECTURE IN A LOCAL MAC MODE

CROSS REFERENCE TO RELATED APPLICATION

This application is a 371 U.S. National Stage of International Application No. PCT/CN2009/075538, filed Dec. 14, 2009, which claims the benefit of CN Patent Application No. 200910021418.X, entitled "METHOD FOR IMPLEMENTING A CONVERGENT WIRELESS LOCAL AREA NETWORK (WLAN) AUTHENTICATION AND PRIVACY INFRASTRUCTURE (WAPI) NETWORK ARCHITECTURE IN A LOCAL MAC MODE", filed on Feb. 27, 2009 with State Intellectual Property Office of PRC, the entirety of which applications are incorporated herein by reference.

FIELD OF THE INVENTION

The present invention relates to a method for implementing a convergent Wireless Local Area Network (WLAN) Authentication and Privacy Infrastructure (WAPI) network architecture in a local Medium Access Control (MAC) mode.

BACKGROUND OF THE INVENTION

In a Wireless Local Area Network (WLAN) with autonomous architecture, a wireless Access Point (AP), which is completely deployed with and interfaced to WLAN functions, is a standalone entity in the network and should be managed independently. At present, WLAN Authentication and Privacy Infrastructure (WAPI) based WLANs all employ the autonomous architecture. However, with the increasing scale of the WLAN deployment, because of its following inherent drawbacks, the operation mode of the network with this autonomous architecture is becoming an obstacle restricting the development of wireless techniques.

Firstly, in the WLAN with the autonomous architecture, AP, as an Internet Protocol (IP) addressable device, should be managed independently, including monitoring, configuring, controlling or the like. In large-scale network deployment, a large number of APs will bring huge management cost, and lead to heavy burden on the network. Such phenomena are more significant especially when the APs in the network are differently configured and managed, which will definitely obstruct the development of wireless techniques.

Secondly, in the WLAN with autonomous architecture, it is difficult to ensure the consistency of all configuration parameters of the AP, because among the configuration parameters of the AP, besides static parameters, most are parameters to be dynamically configured. In a large-scale WLAN, updating the dynamic configurations of APs in the whole network in time is an extremely heavy burden or is even impossible to be accomplished.

Thirdly, wireless transmission media in the WLAN are shared resources, and to improve the performance of the network, each of the APs has to be monitored in real time and the configuration of the AP has be dynamically updated based on the usage of the shared media. However, manually configuring the AP parameters related to the wireless transmission media is labor consuming and costly.

Fourthly, in the WLAN with autonomous architecture, secured access to the network and block of unauthorized APs are relatively difficult. In most cases the AP is hard to be protected due to its deployment position, and once the AP is stolen, loaded security information will be leaked out and thus the network security will be threatened by an attacker via the security information.

In a word, in the WLAN with autonomous architecture, and particularly in large-scale deployment, monitoring, configuring and controlling of the APs will lead to heavy management burden on the network. Moreover, it is hard to maintain the consistency of the AP configuration. Furthermore, the co-operation of the APs in the network required for best network performance and minimum wireless interference due to the sharing and dynamic characteristics of the wireless transmission media imposes higher demand on the configuration management of the APs. Security is one of the key factors to be considered in designing a wireless network, and in the large-scale deployment, the security of the WLAN will encounter huge challenge. Thus, it is urgent to design a WAPI-based convergent WLAN network architecture, i.e. fit AP architecture of WAPI, since the operation mode of the WLAN with autonomous architecture can not meet the requirements of the large-scale network deployment.

SUMMARY OF THE INVENTION

The object of the present invention is to provide a method for implementing a convergent WAPI network architecture in a local Medium Access Control (MAC) mode, so as to overcome the drawbacks of the above autonomous WLAN network architecture. According to the present invention, the centralized control and management of the APs in the whole network are achieved by splitting the MAC function and the WAPI function of the APs, thereby meeting the deployment requirements of the large-scale WLAN.

The present invention provides such a technical solution: a method for implementing a convergent WAPI network architecture in a local MAC mode, which is characterized in that the method includes the following steps:

1) constructing a local MAC mode: splitting a MAC function and a WAPI function of a wireless access point to a wireless terminal point and an access controller respectively;
2) implementing an information interaction between WLAN entities in the local MAC mode;
2.1) a process of associating a station with the wireless terminal point and the access controller;
2.2) a process of notifying a beginning of executing a WLAN Authentication Infrastructure (WAI) protocol between the access controller and the wireless terminal point;
2.3) a process of executing the WAI protocol between the station and the access controller;
2.4) a process of notifying an ending of executing the WAI protocol between the access controller and the wireless terminal point; and
2.5) a process of conducting a privacy communication by using WLAN Privacy Infrastructure (WPI) between the wireless terminal point and the station.

Specifically, the above step 2.1) includes:
2.1.1) passively listening to a beacon frame of the wireless terminal point and obtaining parameters of the wireless terminal point including a WAPI information element, by the station; alternatively, actively sending a probe request frame to the wireless terminal point and obtaining the parameters of the wireless terminal point including the WAPI information element through a probe response frame sent from the wireless terminal point in receipt of the probe request frame, by the station, the WAPI information element including an authentication and key management kit and a password kit supported by the wireless terminal point;

2.1.2) sending a link authentication request frame to the wireless terminal point by the station, for requesting a link authentication with the wireless terminal point;

2.1.3) sending a link authentication response frame to the station by the wireless terminal point in response to the link authentication request frame of the station;

2.1.4) when the link authentication is successful, sending an association request frame to the access controller by the station, for requesting an association to the access controller, where the association request frame includes WAPI information element for determining the authentication and key management kit and the password kit selected by the station; and 2.1.5) resolving the association request frame sent by the station and sending an association response frame to the station, by the access controller.

Specifically, the above step 2.2) includes:

2.2.1) sending a WAI execution beginning notification to the wireless terminal point by the access controller, for notifying the wireless terminal point of information including a MAC address of the station, a WLAN ID and an authentication beginning identifier, in which the authentication beginning identifier is used for notifying the wireless terminal point to close a controlled port and to forward only the WAI protocol data from the corresponding station; and 2.2.2) sending a WAI execution beginning notification response message to the access controller by the wireless terminal point.

Specifically, the above step 2.3) includes:

2.3.1) a process of a WAI authentication between the access controller and the station;

2.3.2) a process of negotiating a WAI unicast key between the access controller and the station; and 2.3.3) a process of notifying a WAI multicast key between the access controller and the station.

Specifically, the above step 2.4) includes:

2.4.1) sending a WAI execution ending notification to the wireless terminal point by the access controller, for notifying the wireless terminal point of information including the MAC address of the station, the WLAN ID, key data, password kit, an authentication ending identifier and the like, in which the authentication ending identifier is used for notifying the wireless terminal point to open the controlled port and to forward any data from the corresponding station, including the WAI protocol data and non-WAI protocol data; and 2.4.2) sending a WAI execution ending notification response message to the access controller by the wireless terminal point.

Specifically, the above step 2.5) includes:

2.5.1) ciphering and sending data intended for the station by the wireless terminal point; and 2.5.2) deciphering and forwarding data originated from the station by the wireless terminal point.

Following the above step 2.5), the method further includes a step 2.6) of updating a unicast key between the access controller and the station.

Specifically, the above step 2.6) includes:

2.6.1) when the unicast key is to be updated, performing a process of WAI unicast key negotiation between the access controller and the station;

2.6.2) after the process of WAI unicast key negotiation is completed, sending a unicast key updating notification to the wireless terminal point by the access controller, for notifying information including a MAC address of the station, a WLAN ID, updated unicast key data, an updated password kit and the like; and 2.6.3) sending a unicast key updating notification response to the access controller by the wireless terminal point.

Following the above step 2.5) or step 2.6), the method further includes a step 2.7) of updating a multicast key between the access controller and the station.

Specifically, the above step 2.7) includes:

2.7.1) when the access controller needs to update the multicast key, firstly, sending a multicast key updating beginning notification, which includes a WLAN ID, multicast key data, a Packet Number (PN) and the like, to the wireless terminal point by the access controller;

2.7.2) upon receiving the multicast key updating beginning notification, sending a multicast key updating beginning notification response to the access controller, by the wireless terminal point;

2.7.3) performing a process of WAI multicast key notification between the access controller and the station;

2.7.4) after the process of WAI multicast key notification is completed, sending a multicast key updating ending notification, which includes a multicast key index, a multicast key updating ending identifier and the like, to the wireless terminal point by the access controller; and 2.7.5) sending a multicast key updating ending notification response to the access controller by the wireless terminal point, in response to the multicast key updating ending notification sent by the access controller.

The present invention provides a flow of communication interaction between entities with the convergent WLAN network architecture in the local MAC mode, in which the MAC function and the WAPI function of the AP are split to the Wireless Terminal Point (WTP) and the Access Controller (AC). Specifically, the WTP implements the interaction with the Station (STA) including the beacon frame, the response to probe request and the like, and further implements the WPI protocol; while the AC implements the interaction with the STA including the association, the WAPI protocol and the like. This mode for splitting the functions of AP is referred to as the local MAC mode. Compared with the prior art, the present invention has the following advantages: the present invention provides a method for implementing a convergent WAPI network architecture in a local MAC mode, which breaks the limitation that the existing WAPI protocol based autonomous network architecture can not meet the requirement of the large-scale WLAN deployment. With the local MAC mode, the unified monitoring, configuring and controlling of the WTPs by the AC are implemented, so that the centralized management of WTPs in the WLAN are achieved; by implementing the WAI protocol by the AC and implementing the WPI protocol by the WTP, a seamless integration of the WAPI protocol and the convergent WLAN architecture is established, and the security of the WLAN is ensured. To sum up, the present invention not only satisfies the requirement of the large-scale WLAN deployment, but also ensures the security of the WLAN in the convergent architecture.

DETAILED DESCRIPTION OF THE INVENTION

Figure 1:
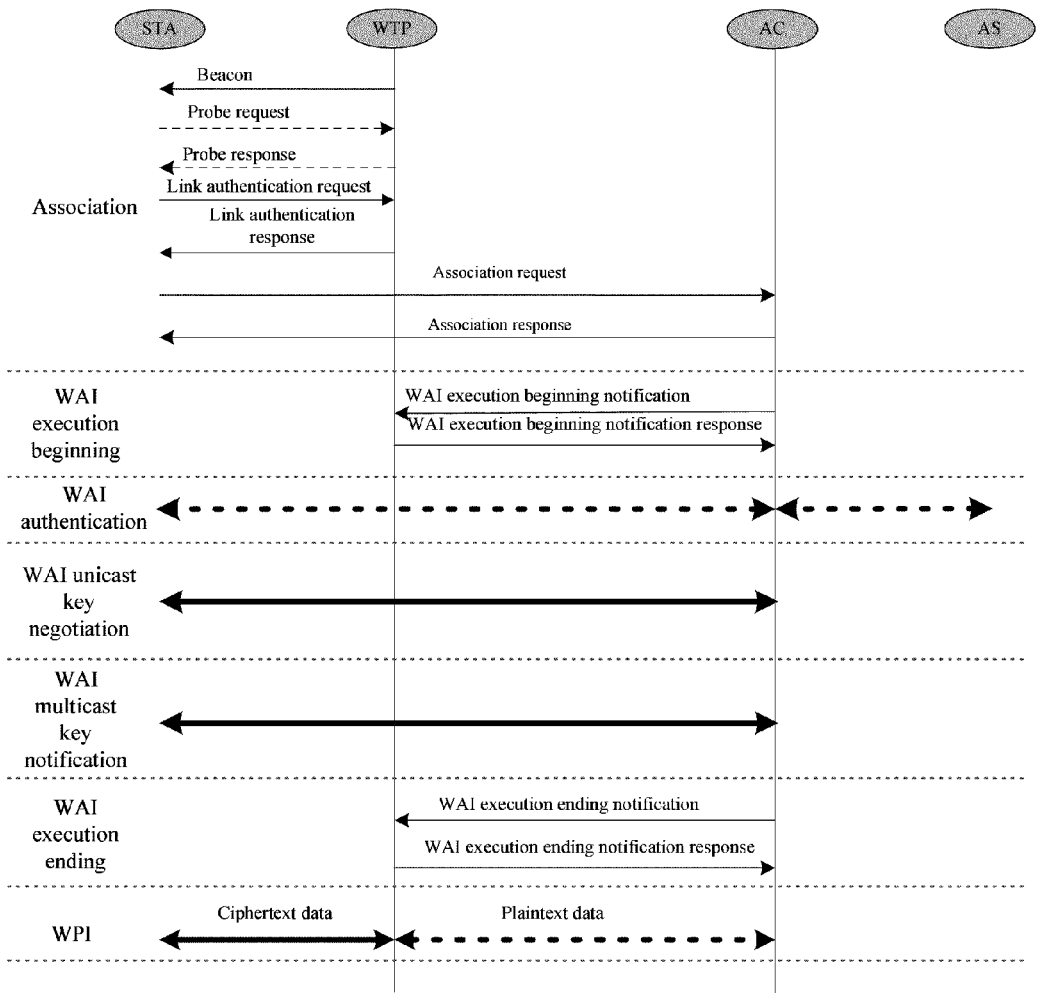
FIG. 1 is a chart of the message flow of a convergent WAPI network architecture in a local MAC mode.

Referring to FIG. 1, in accordance with a preferred embodiment of the present invention, the method includes:
1) constructing a local MAC mode: splitting a MAC function and a WAPI function of AP to a wireless terminal point (WTP) and an access controller (AC) respectively;
2) integrating the WAPI with the convergent WLAN network architecture in the local MAC mode;
2.1) associating a STA with the WTP and the AC;
2.1.1) the STA passively listening to a beacon frame of the WTP and obtaining related parameters of the WTP including a WAPI information element, for example, an authentication and key management kit and a password kit supported by the WTP; or the STA actively sending a probe request frame to the WTP and obtaining the related parameters of the WTP through a probe response frame sent from the WTP in receipt of the probe request frame, where the related parameters of the WTP includes the WAPI information element, for example, the authentication and key management kit and the password kit supported by the WTP;
2.1.2) the STA sending a link authentication request frame to the AC, for requesting a link authentication with the AC;
2.1.3) the WTP sending a link authentication response frame to the STA in response to the link authentication request frame of the STA;
2.1.4) when the link authentication is successful, the STA sending an association request frame to the AC, for requesting an association to the AC, where the association request includes the WAPI information element for determining the authentication and key management kit and the password kit selected by the station; and
2.1.5) the AC resolving the association request frame sent by the STA, and sending an association response frame to the STA;
2.2) notifying a beginning of executing a WAI protocol between the AC and the WTP;
2.2.1) the AC sending a WAI execution beginning notification to the WTP, for notifying the WTP of information including a MAC address of the STA, a WLAN ID, an authentication beginning identifier and the like, in which the authentication beginning identifier is used for notifying the WTP to close a controlled port and to forward only the WAI protocol data from the corresponding STA; and
2.2.2) the WTP sending a WAI execution beginning notification response message to the AC;
2.3) executing the WAI protocol between the STA and the AC;
2.3.1) performing a WAI authentication between the AC and the STA;
2.3.2) performing a WAI unicast key negotiation between the AC and the STA; and
2.3.3) performing a WAI multicast key notification between the AC and the STA;
2.4) notifying an ending of executing the WAI protocol between the AC and the WTP;
2.4.1) the AC sending a WAI execution ending notification to the WTP, for notifying the WTP of information including a MAC address of the STA, a WLAN ID, key data, a password kit, an authentication ending identifier and the like, in which the authentication ending identifier is used for notifying the WTP to open the controlled port and to forward any data from the corresponding STA, including the WAI protocol data and the non-WAI protocol data; and
2.4.2) the WTP sending a WAI execution ending notification response message to the AC;
2.5) conducting a privacy communication between the WTP and the STA by using the WPI;
2.5.1) the WTP ciphering and sending the data intended for the STA; and
2.5.2) the WTP deciphering and forwarding the data originated from the STA.

Figure 2:
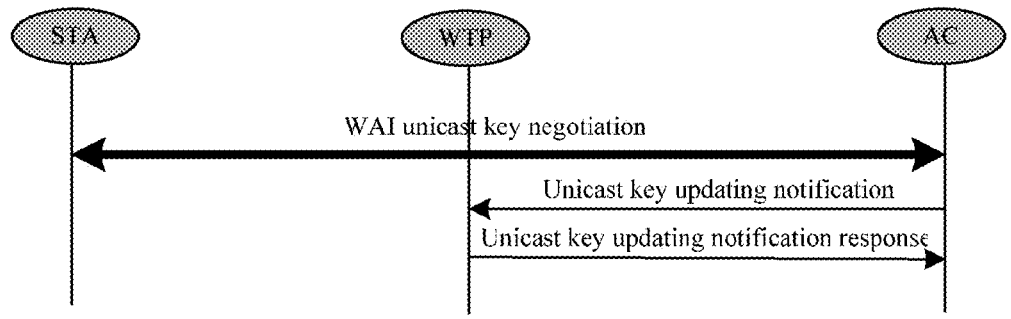
FIG. 2 is a flow chart showing a unicast key updating between AC and STA.

Referring to FIG. 2, the flow of the present invention further includes a step 2.6) of updating a unicast key between the AC and the STA:
2.6.1) when the unicast key is to be updated, performing a WAI unicast key negotiation between the AC and the STA;
2.6.2) after the unicast key negotiation is completed, the AC sending a unicast key updating notification to the WTP, for notifying the WTP of information including a MAC address of the STA, a WLAN ID, updated unicast key data, a password kit and the like; and
2.6.3) the WTP sending a unicast key updating notification response to the AC.

Figure 3:
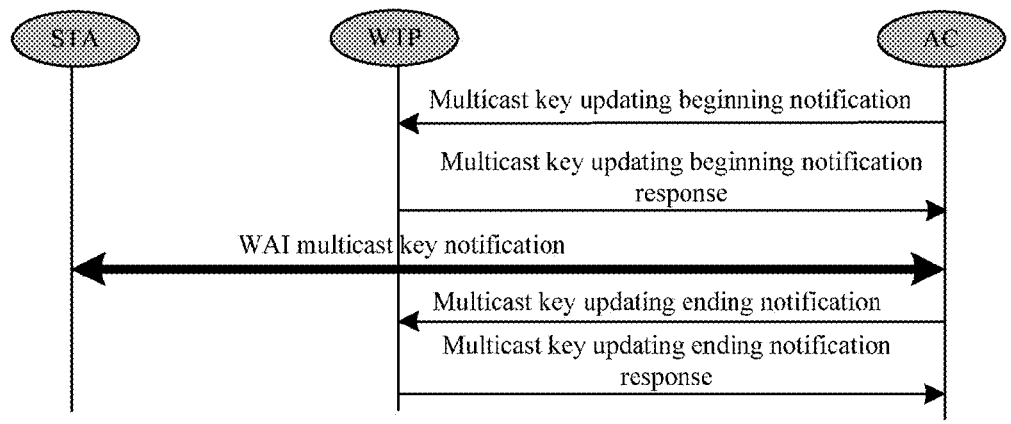
FIG. 3 is a flow chart showing a multicast key updating between AC and STA.

Referring to FIG. 3, the flow of the present invention further includes a step 2.7) of updating a multicast key between the AC and the STA:
2.7.1) when the AC needs to update the multicast key, firstly the AC sending a multicast key updating beginning notification to the WTP, where the multicast key updating beginning notification includes a WLAN ID, multicast key data, a Packet Number (PN) and so on;
2.7.2) upon receiving the multicast key updating beginning notification, the WTP sending a multicast key updating beginning notification response to the AC;
2.7.3) performing a process of WAI multicast key notification between the AC and the STA;
2.7.4) after the process of WAI multicast key notification, the AC sending a multicast key updating ending notification to the WTP, where the multicast key updating ending notification includes a multicast key index, a multicast key updating ending identifier and the like; and
2.7.5) the WTP sending a multicast key updating ending notification response to the AC in response to the multicast key updating ending notification of the AC.

In the above embodiment, to ensure the security of the key data in the steps 2.2), 2.4), 2.6) and 2.7), a secured channel can be prearranged between the AC and the WTP, and this secured channel can be established by constructing a private network between the AC and the WTP or by using security protocols (such as Datagram Transport Layer Security (DTLS) protocol).

What is claimed is:
1. A method for implementing a convergent Wireless Local Area Network Authentication and Privacy Infrastructure WAPI network architecture in a local Medium Access Control MAC mode, characterized in that the method comprises the following steps:
1) constructing the local MAC mode by splitting a MAC function to a wireless terminal point and an access controller and splitting a WAPI function of a wireless terminal point and the access controller, wherein the wireless terminal point is different than a station and the access controller is different than an authentic server;

2) achieving integration between the WAPI and the convergent Wireless Local Area Network WLAN network architecture in the local MAC mode, wherein the step 2) comprises:

2.1) performing a process of associating a station with the wireless terminal point and the access controller;

2.2) performing a process of notifying a beginning of executing a WLAN Authentication Infrastructure (WAI) protocol between the access controller and the wireless terminal point;

2.3) performing a process of executing the WAI protocol between the station and the access controller to complete a mutual authentication between the station and the access controller, wherein the mutual authentication comprises the access controller authenticating the station and the station authenticating the access controller;

2.4) performing a process of notifying an ending of executing the WAI protocol between the access controller and the wireless terminal point;

2.5) performing a process of conducting a privacy communication by using WLAN Privacy Infrastructure WPI between the wireless terminal point and the station;

wherein the step 2.1) comprises:

2.1.1) passively listening to a beacon frame of the wireless terminal point and obtaining parameters of the wireless terminal point including a WAPI information element, by the station; or, actively sending a probe request frame to the wireless terminal point and obtaining the parameters of the wireless terminal point including the WAPI information element through a probe response frame sent from the wireless terminal point in receipt of the probe request frame, by the station; the WAPI information element comprising an authentication and key management kit and a password kit supported by the wireless terminal point;

2.1.2) sending a link authentication request frame to the wireless terminal point by the station, for requesting a link authentication with the wireless terminal point;

2.1.3) sending a link authentication response frame to the station by the wireless terminal point in response to the link authentication request frame of the station.

2. The method of claim 1, wherein the step 2.1) further comprises:

2.1.4) when the link authentication is successful, sending an association request frame to the access controller by the station, for requesting an association to the access controller, wherein the association request frame comprises WAPI information element for determining the authentication and key management kit and the password kit selected by the station; and 2.1.5) resolving the association request frame sent by the station and sending an association response frame to the station, by the access controller.

3. The method of claim 1, wherein the step 2.2) comprises:

2.2.1) sending a WAI execution beginning notification to the wireless terminal point by the access controller, for notifying the wireless terminal point of information comprising a MAC address of the station, a WLAN ID and an authentication beginning identifier, wherein the authentication beginning identifier is used for notifying the wireless terminal point to close a controlled port and to forward only the WAI protocol data from the corresponding station; and 2.2.2) sending a WAI execution beginning notification response message to the access controller by the wireless terminal point.

4. The method of claim 1, wherein the step 2.3) comprises:

2.3.1) performing a process of a WAI authentication between the access controller and the station;

2.3.2) performing a process of negotiating a WAI unicast key between the access controller and the station; and 2.3.3) performing a process of notifying a WAI multicast key between the access controller and the station.

5. The method of claim 1, wherein the step 2.4) comprises:

2.4.1) sending a WAI execution ending notification to the wireless terminal point by the access controller, for notifying the wireless terminal point of information comprising a MAC address of the station, a WLAN ID, key data, a password kit, and an authentication ending identifier, wherein the authentication ending identifier is used for notifying the wireless terminal point to open the controlled port and to forward any data from the corresponding station; and 2.4.2) sending a WAI execution ending notification response message to the access controller by the wireless terminal point.

6. The method of claim 1, wherein the step 2.5) comprises:

2.5.1) ciphering and sending data intended for the station by the wireless terminal point; and 2.5.2) deciphering and forwarding data originated from the station by the wireless terminal point.

7. The method of claim 1, wherein the step 2.5) is followed by a step 2.6) of updating a unicast key between the access controller and the station.

8. The method of claim 7, wherein the step 2.6) comprises:

2.6.1) when the unicast key is to be updated, performing a process of WAI unicast key negotiation between the access controller and the station;

2.6.2) after the process of WAI unicast key negotiation is completed, sending a unicast key updating notification to the wireless terminal point by the access controller, for notifying information comprising a MAC address of the station, a WLAN ID, updated unicast key data and an updated password kit; and 2.6.3) sending a unicast key updating notification response to the access controller by the wireless terminal point.

9. The method of claim 1, wherein the step 2.5) is followed by a step 2.7) of updating a multicast key between the access controller and the station.

10. The method of claim 9, wherein the step 2.7) comprises:

2.7.1) when the access controller needs to update the multicast key, firstly, sending a multicast key updating beginning notification, which comprises a WLAN ID, multicast key data, and a Packet Number PN, to the wireless terminal point by the access controller;

2.7.2) upon receiving the multicast key updating beginning notification, sending a multicast key updating beginning notification response to the access controller, by the wireless terminal point;

2.7.3) performing a process of WAI multicast key notification between the access controller and the station;

2.7.4) after the process of WAI multicast key notification is completed, sending a multicast key updating ending notification, which comprises a multicast key index and a multicast key updating ending identifier, to the wireless terminal point by the access controller; and 2.7.5) sending a multicast key updating ending notification response to the access controller by the wireless terminal point, in response to the multicast key updating ending notification sent by the access controller.

* * * * *